US008453139B2

(12) United States Patent
Tanaka et al.

(10) Patent No.: US 8,453,139 B2
(45) Date of Patent: May 28, 2013

(54) CONDITIONAL STARTUP PROCESS FOR A GAME APPARATUS AND INFORMATION PROCESSING APPARATUS

(75) Inventors: Shinichi Tanaka, Kanagawa (JP); Muneki Shimada, Tokyo (JP)

(73) Assignees: Sony Corporation, Tokyo (JP); Sony Computer Entertainment, Inc., Tokyo (JP)

( * ) Notice: Subject to any disclaimer, the term of this patent is extended or adjusted under 35 U.S.C. 154(b) by 1334 days.

(21) Appl. No.: 11/983,136

(22) Filed: Nov. 7, 2007

(65) Prior Publication Data

US 2008/0141018 A1  Jun. 12, 2008

(30) Foreign Application Priority Data

Nov. 9, 2006 (JP) .................... 2006-304616

(51) Int. Cl.
*G06F 9/44* (2006.01)
*A63F 13/00* (2006.01)
*A63F 13/10* (2006.01)

(52) U.S. Cl.
USPC ............... 717/170; 717/122; 463/29; 463/44

(58) Field of Classification Search
None
See application file for complete search history.

(56) References Cited

U.S. PATENT DOCUMENTS

| 5,134,391 | A  | * | 7/1992 | Okada ..................... 340/5.74 |
| 5,599,231 | A  | * | 2/1997 | Hibino et al. ............... 463/29 |
| 2002/0122068 | A1 | * | 9/2002 | Tsuruoka ................. 345/810 |
| 2005/0262163 | A1 | * | 11/2005 | Seki et al. ................. 707/203 |

FOREIGN PATENT DOCUMENTS

| JP | 2000 47876 | 2/2000 |
| JP | 2000 181876 | 6/2000 |
| JP | 2001 084131 | 3/2001 |
| JP | 2002 091787 | 3/2002 |
| JP | 2004 145730 | 5/2004 |

\* cited by examiner

*Primary Examiner* — Insun Kang
*Assistant Examiner* — Erika Kretzmer
(74) *Attorney, Agent, or Firm* — Frommer Lawrence & Haug LLP; William S. Frommer (57) ABSTRACT

The present invention provides a technique of executing a suitable file from plural files of the same type. In a game apparatus, a ROM medium with game data recorded therein is loaded into a drive device. A patch file acquisition unit acquires a patch file for the game data, and stores the patch file in a HDD. The ROM medium and the patch file respectively include boot files for initiating a main program. An execution processor loads into the memory, the boot file having newer version information, and executes a boot sequence. The execution processor does not execute the boot sequence, when the ROM medium is not loaded into the drive device, and executes the boot sequence, as a condition that the ROM medium is loaded into the drive device.

11 Claims, 8 Drawing Sheets

FIG.1

RELATED ART

RELATED ART

FIG.3

RELATED ART

PARAMETER. A

FIG.7A

/GAME/AAA00001/PARAMETER. A
BOOT. B

FIG.7B

TITLE ID: AAA00001
VERSION: 1.1
⋮
IMAGE RESOLUTION: 1080

PARAMETER. A

CONDITIONAL STARTUP PROCESS FOR A GAME APPARATUS AND INFORMATION PROCESSING APPARATUS

BACKGROUND OF THE INVENTION

1. Field of the Invention

The present invention relates to an information processing technique implemented by an information processing apparatus such as a game console.

2. Description of the Related Art

Game data (a game program) is generally sold in the form of a ROM medium such as an optical disc or magnet optical disc. The game data recorded in a ROM medium cannot be rewritten. Thus, a patch can be applied to solve bugs included in the game data, alter the function thereof, and add a function thereto.

For instance, Japanese Patent No. JP 2000-47876 discloses a boot technique with a memory card, when a game console is powered on or the hardware reset is executed. In such boot technique, in the case where the boot image displaying program is stored in a memory card, the boot sequence will be executed by the boot image displaying program when the game console is powered on or the hardware reset is executed. In the case where the boot image displaying program is not stored in the memory card, the boot sequence will be executed by the boot image displaying program stored in a built-in boot ROM. The boot technique disclosed in JP 2000-47876 allows executing the boot sequence with ease and in an appropriate manner depending on whether or not a patch file (boot image displaying program) is present in the memory card, thereby providing a technical advantage.

It is assumed that the game data will be executed at the completion of the system boot. Firstly, the boot file of the game data is executed. In the case where the ROM medium that records the game data is sold and then a patch file thereof is made available, in general, the boot file of the game data in the ROM medium is executed, and at the same time, the patch file is read out and executed. After this, in the case where a remastered ROM medium is sold newly, it may be more desirable to initiate a game startup process with the remastered ROM medium than to initiate the game startup process with the patch file for the initial ROM medium. It is therefore preferable that an appropriate file be selected and executed in the environment where plural boot files are available. Also, in the case where a new character is added in a game application in addition to the case where the game startup process is executed, it is preferable that an appropriate file be selected from plural available files of the same type and then be executed. This situation is not limited to the game application, and a similar situation occurs in another application such as accounting software.

SUMMARY OF THE INVENTION

The present invention has a general purpose of providing a technique for choosing a suitable file from among plural files of the same type and executing it.

A game apparatus according to at least one embodiment of the present invention, comprising: a drive device into which a memory medium with game data is loaded; a storage device which retains a patch file of the game data; a first version information acquisition unit which acquires first version information recorded in the memory medium via the drive device; a second version information acquisition unit which acquires second version information included in the patch file retained in the storage device; a comparator which compares the first version information acquired by the first version information acquisition unit with the second version information acquired by the second version information acquisition unit; and an execution processor which loads into a memory a given file from either the memory medium or the patch file, which has newer version information.

An information processing apparatus according to at least one other embodiment of the present invention, comprising: a drive device into which a memory medium with application data is loaded; a storage device which retains a patch file of the application data; a first version information acquisition unit which acquires first version information recorded in the memory medium via the drive device; a second version information acquisition unit which acquires second version information included in the patch file retained in the storage device; a comparator which compares the first version information acquired by the first version information acquisition unit with the second version information acquired by the second version information acquisition unit; and an execution processor which loads into a memory a given file from either the memory medium or the patch file, which has newer version information.

Optional combinations of the aforementioned constituting elements, and implementations of the invention in the form of methods, processors, apparatuses, systems, recording media, computer programs, data structures, etc. may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
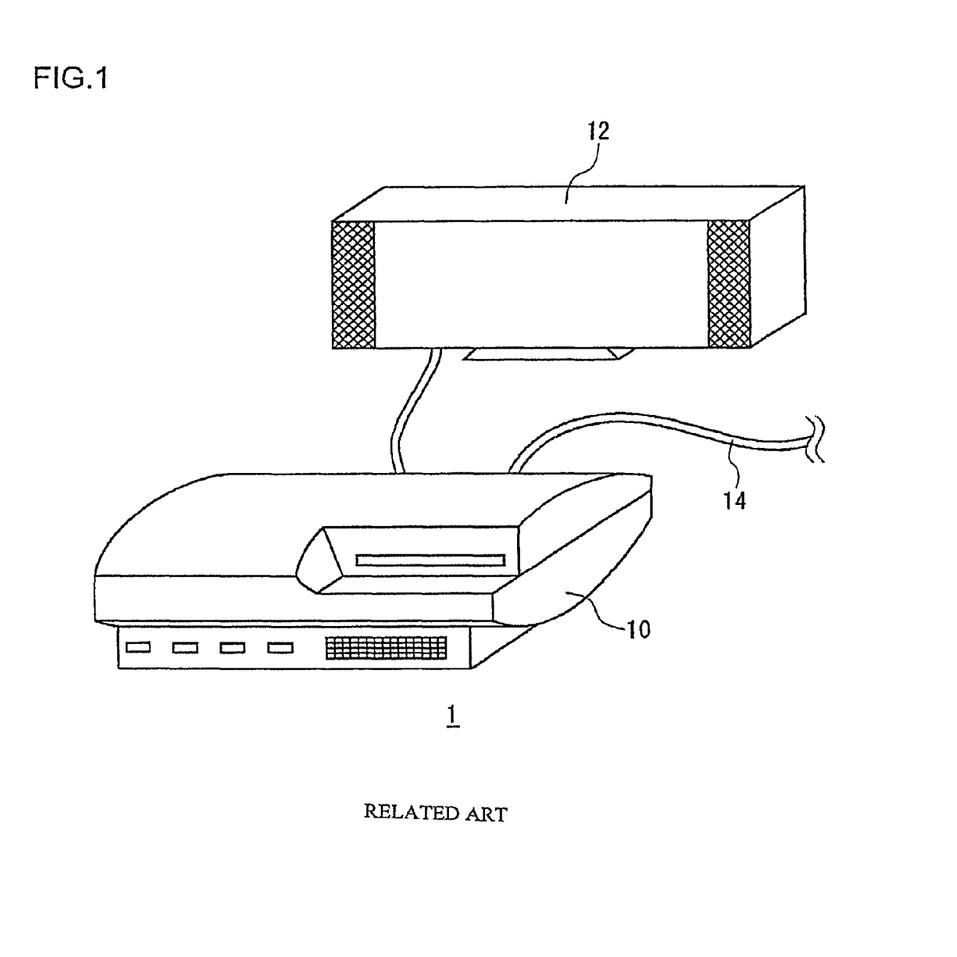
FIG. 1 illustrates a game system according to an embodiment of the present invention.

FIG. 1 illustrates a game system according to an embodiment of the present invention. A game system 1 is provided with: a game console 10 that executes a game application; and a display device 12 that outputs the result of the process performed in the game console 10. The display device 12 includes a display unit that outputs an image, and may be composed of a television set having an audio outputting unit that outputs audio. The display device 12 may be connected to the game console 10 with a wired cable, or may be connected wirelessly by a wireless Local Area Network (LAN). In the game system 1, the game console 10 is connected to an external network such as the Internet via a cable 14. Also, the game console 10 may be connected wirelessly to an external network.

The game console 10 is an information processing apparatus into which a ROM medium having game data recorded therein is loaded, executes the game data, and generates an image signal and an audio signal representing the processing result of the game application. The technique discussed in the present embodiment is implemented not only in the game console 10 but also in an information processing apparatus into which a ROM medium having a program such as accounting software or CAD software recorded therein is loaded.

Figure 2:
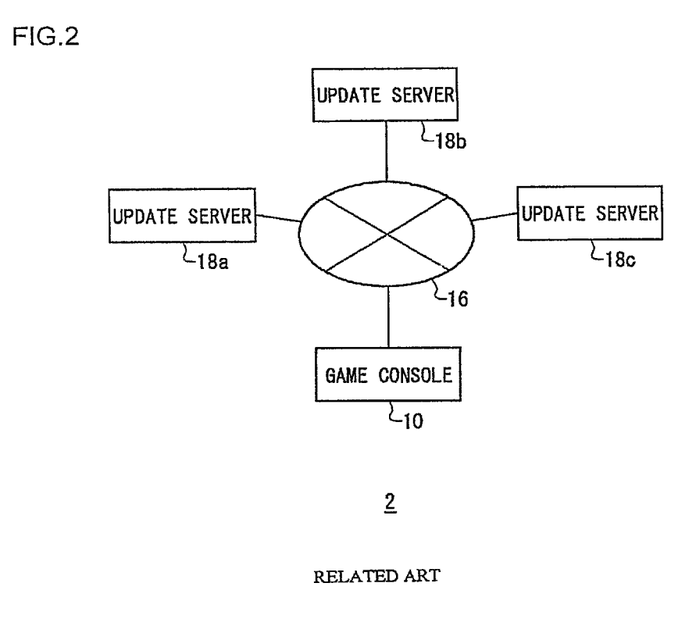
FIG. 2 illustrates a file update system according to an embodiment of the present invention.

FIG. 2 illustrates a file update system according to the embodiment of the present invention. In a file update system 2, the game console 10 that is a user terminal is connected to update servers 18a, 18b, and 18c (hereinafter, generically referred to as "update server 18") that are terminals owned by a game production company or the like, in a communicable manner via a network 16 such as the Internet. The game production company generates a patch file of game data and then stores the patch file in the update server 18, so that the game console 10 can download the patch file from the update server 18. The patch file is used for solving the bugs in a program in a ROM medium, altering the function thereof, or adding a function thereto.

The game console 10, for example, may be configured to access each of the update servers 18 on a regular basis and download a patch file, if any patch file is present. Also, before playing the game, a user may download the patch file into the game console 10 from the update server 18 provided for the game data. In this way, the patch file is downloaded into the game console 10, before the ROM medium is loaded to the game console 10, whereby the game data can be executed while being kept up to date. The game console 10 includes a high-capacity auxiliary storage, so the patch file downloaded from the update server 18 is stored in a given area of the auxiliary storage.

Figure 3:
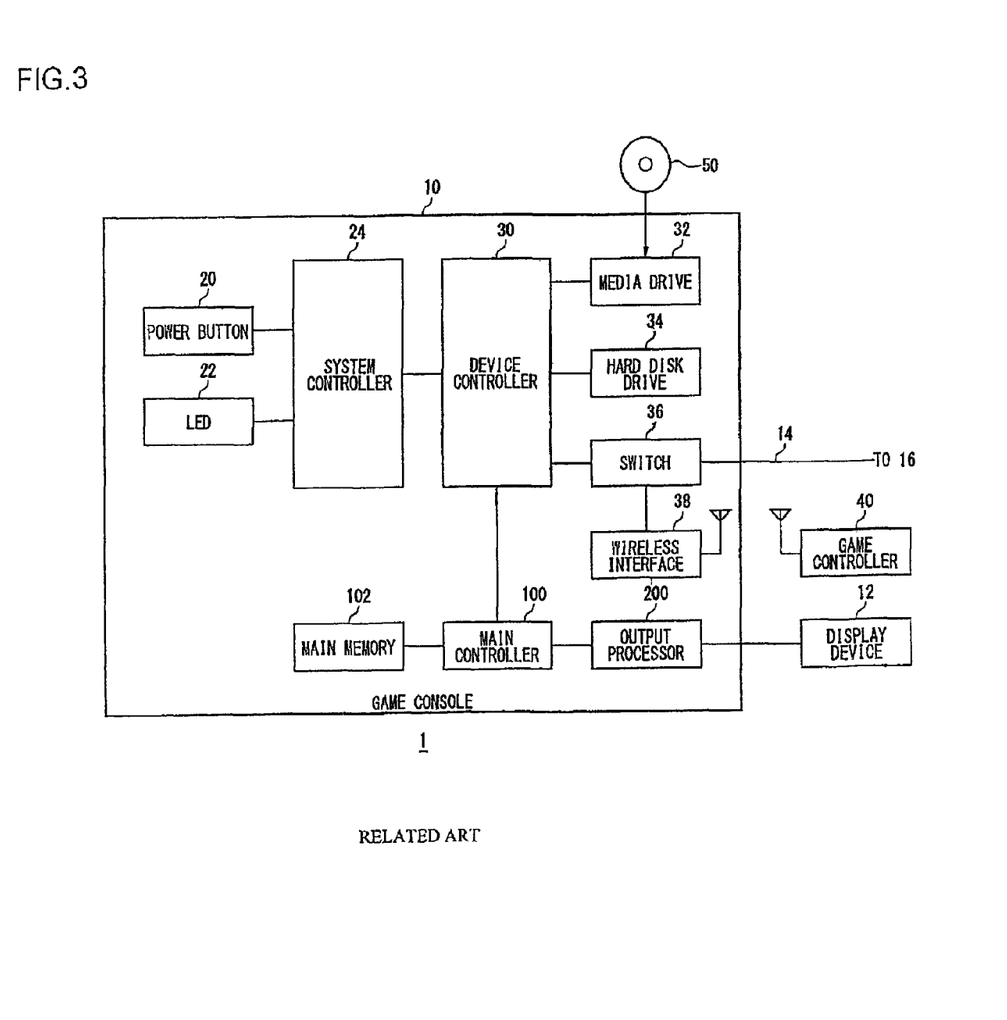
FIG. 3 illustrates a functional block diagram of a game console.

FIG. 3 illustrates a functional block diagram of the game console 10. The game console 10 includes: a power button 20; an LED 22; a system controller 24; a device controller 30; a media drive 32; a hard disk drive 34; a switch 36; a wireless interface 38; a main controller 100; a main memory 102; and an output processor 200.

The power button 20 serves as an input unit by which a user performs an input operation, and is operated to turn on or off the power supplied to the game console 10. The power button 20 may be a press button, and the power on or off may be controlled by pressing the power button 20. Also, the power button 20 may have another configuration, such as a touch sensor, so that a user can power on or power off. The LED 22 indicates the power-on state or the power-off state by lighting. The system controller 24 detects the pressed state and the non-pressed state of the power button 20. When detecting that the state is changed from the power-off state to the pressed state, the system controller 24 activates the main controller 100 to control lighting of the LED 22. When a power cable is inserted into the game console 10, the system controller 24 maintains the standby mode even in the power-off state and monitors whether the power button 20 is pressed.

The device controller 30 is configured as a Large-Scale Integrated circuit (LSI) such as a south bridge that causes devices to send and receive information therebetween. As illustrated in the figure, the device controller 30 is connected to devices such as the system controller 24, the media drive 32, the hard disk drive 34, the switch 36, and the main controller 100. The device controller 30 absorbs the difference in the electric property or the difference in the transfer speed between the devices to control the timing of data transfer.

The media drive 32 serves as a drive apparatus that drives with a ROM medium 50 recording the game data loaded therein and reads out the game data from the ROM medium 50. The ROM medium 50 is a read-only recording medium, such as an optical disc, magnetic optical disc, Blu-ray Disc, or the like. The game data includes: a main program that executes a game application; a boot file that initiates the main program; a configuration file that includes an image resolution, version information, information for identifying the location where the patch file is stored; and information on the content of the application. Hereinafter, data or file of the game data from which the operating procedure is directed will sometimes be referred to as "game program". For example, the main program or the boot file corresponds to the game program.

The main program is a program necessary for processing an application. By running the main program, the game application proceeds. The boot file is a program for initiating the main program. The execution of the boot file calls and executes the main program. In the configuration file, the image resolution specifies the resolution of an image to be output by the main program. The version information identifies the version of the boot file. The version information may be the one that can identify the generation order of the boot file. Numerals may be given in the ascending order. The version information may be the information that identifies the date when the boot file was created. The information that identifies the location where the patch file is stored is the information that identifies the location in the hard disk drive 34 where the patch file is stored, and is used for reading out the information of the patch file supplied from the update server 18. Also, the content information is data that includes the title name and help information for the application. The content information is used for displaying the title of the game application with an icon or displaying explanatory information on a menu screen of the game console 10, so as to inform a user of the content of the game application. The content information may include a still image icon and/or a moving image icon as an icon to be displayed.

The hard disk drive 34 is an auxiliary storage that drives the built-in hard disk and writes/reads data using a magnetic head. The switch 36 is an Ethernet switch (Ethernet is a registered trademark) as well as a device that sends and receives information, by connecting an external device by wire or wirelessly. In the present embodiment, the cable 14 is inserted into the switch 36, and is connected with the network 16 in a communicable manner. In addition, the switch 36 is connected to the wireless interface 38, and the wireless interface 38 is connected to a game controller 40 with a function of wireless communication by means of communication protocols such as Bluetooth (registered trademark) or IEEE 802.11 protocol. The game controller 40 serves as an input unit by which a user performs an input operation.

The main controller 100 is provided with a multicore CPU, in which a single CPU includes a single general-purpose processor core and plural simple processor cores. The general-purpose processor will be referred to as Power Processing Unit (PPU), and remaining processors will be referred to as Synergistic-Processing Unit (SPU).

An operating system that abstracts the interface with hardware and provides the abstracted interface to application software (hereinafter, simply referred to as Operating System (OS)) is executed in the main controller 100 of the game console 10. The OS is executed on the base software named hypervisor in the game console 10. Software named "privilege software" is executed in the hypervisor to provide the environment for executing the OS such as an OS for a game. Whenever the power is switched on by the power button 20, the hypervisor is activated.

The main controller 100 is provided with a memory controller connected to the main memory 102, which is a main memory. The PPU includes: a register; and a main processor serving as an entity that performs an arithmetic operation, and assigns tasks, each being a basic unit of processing in each application, to the SPUs, respectively, in an efficient manner. Also, the PPU itself may execute the task. Each of the SPUs includes: a register; a sub processor serving as an entity that performs an arithmetic operation; and a local memory (dedicated RAM) as a local memory area. The SPU has a dedicated DMA (Direct Memory Access) controller as a control unit, and is therefore capable of performing the data stream process at high speed by transferring the data between the main memory 102 and the local memory, and is also capable of transferring data at high speed between a frame memory equipped in the output processor 200 and the local memory.

The output processor 200 is connected to the display device 12, and outputs an image signal and a sound signal that are processing results of an application. The output processor 200 is provided with a Graphics Processing Unit (GPU) that fulfills the function of image processing. The GPU employs a High Definition Multimedia Interface (HDMI) so that a digital image signal can be output.

Figure 4:
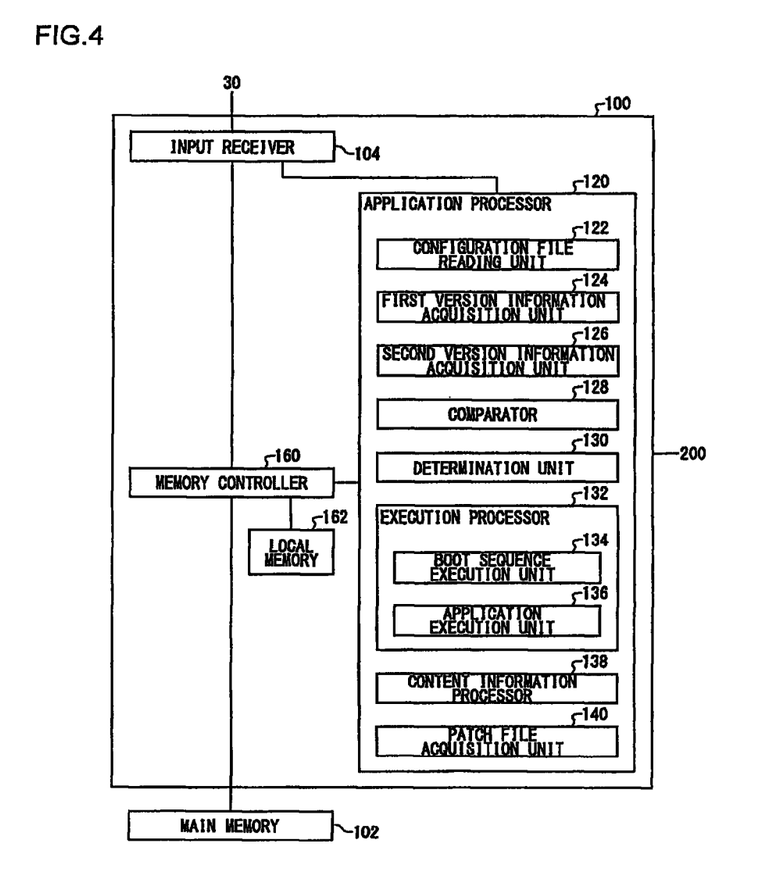
FIG. 4 illustrates the interior of a main controller.

FIG. 4 illustrates the interior of the main controller 100. The main controller 100 is provided with: an input receiver 104; an application processor 120; a memory controller 160; and a local memory 162.

The elements illustrated in FIG. 4 as functional blocks that perform various processes can be configured with a CPU (Central Processing Unit), memory, or another LSI in terms of hardware, and can be implemented by a program loaded into the memory in terms of software. As stated above, the main controller 100 includes a single PPU and plural SPUs, so that each of the functional blocks can be implemented by only PPU, by only SPU, or by cooperation of both. Therefore, it should be understood by those skilled in the art that the functional blocks can be achieved in various manners by only hardware, by only software, and by the combinations of hardware and software, without being limited to any of them.

The memory controller 160 controls writing from or reading into the main memory 102 located in the outside or writing from or reading into the local memory 162 installed in the SPU. The memory controller 160, being controlled by an instruction given by the application processor 120, stores the data read from a hard disk or the ROM medium 50, in the main memory 102 or in the local memory 162.

The application processor 120 includes: a configuration file reading unit 122; a first version information acquisition unit 124; a second version information acquisition unit 126; a comparator 128; a determination unit 130; an execution processor 132; a content information processor 138; and a patch file acquisition unit 140. The execution processor 132 includes a boot sequence execution unit 134 and an application execution unit 136. The application processor 120 mainly has a function of executing the boot sequence of the main program so as to initiate the main program.

In the file update system 2, the patch file for the game data supplied from the update server 18 is acquired by the patch file acquisition unit 140 and stored in a predetermined region of the hard disk drive 34. The patch file acquisition unit 140 may acquire the patch file from the memory medium such as a memory card removable from the game console 10. For example, the patch file acquisition unit 140 has a list that identifies the game data of the ROM medium 50 that has been loaded into the media drive 32 in the past, and accesses on a regular basis the update server 18 that manages the updating of the game data included in the above list. In the case where the update server 18 retains the patch file of the game data, the patch file acquisition unit 140 downloads the patch file and then stores the file in the hard disk drive 34. The patch file is retained in a directory provided for each piece of the game data. Also, the patch file for an identical game title is overwritten and retained.

Considering that the hard disk drive 34 is a storage device for storing the amount of data much larger than that of the patch file, the patch file acquisition unit 140 may download all the patch files for all of the game data present in the file update system 2. Since a title ID that identifies the title is given to the game data, the patch file acquisition unit 140 may create, with the title ID, a directory for storing the patch file for each piece of the game data to store the corresponding patch file therein. There are various ways of naming the directory; however, whichever way is selected, it is necessary for the second version information acquisition unit 126 to identify the location where the patch file corresponding to the game data of the ROM medium 50 is stored, when the game data is activated. Preferably, the location where the patch file is stored is identifiable from the information included in the configuration file of the ROM medium 50.

The ROM medium 50 being loaded into the media drive 32 is a condition necessary for starting the game, but is not the condition necessary for downloading the patch file. Thus, the patch file acquisition unit 140 is capable of downloading the patch file relating to the game data from the update server 18, regardless of whether or not the ROM medium 50 is loaded into the media drive 32. This allows the storing of the latest patch file in the hard disk drive 34, when the ROM medium 50 is loaded into the media drive 32.

The main controller 100 includes the input receiver 104, as a means of sending and receiving control information to and from the device controller 30. The input receiver 104 receives a user's operational input from the game controller 40.

In the game system 1, a user inserts the ROM medium 50 that stores data of a desired game into the media drive 32, when playing the game. The game console 10 performs an authentication process on the ROM medium 50 to determine whether or not the ROM medium 50 is a genuine product. When the ROM medium 50 is determined as a genuine product, the presence of the ROM medium 50 is displayed on the screen of the display device 12. In this process, the content information processor 138 acquires the content information from the ROM medium 50, and outputs the information to the output processor 200.

Figure 5:
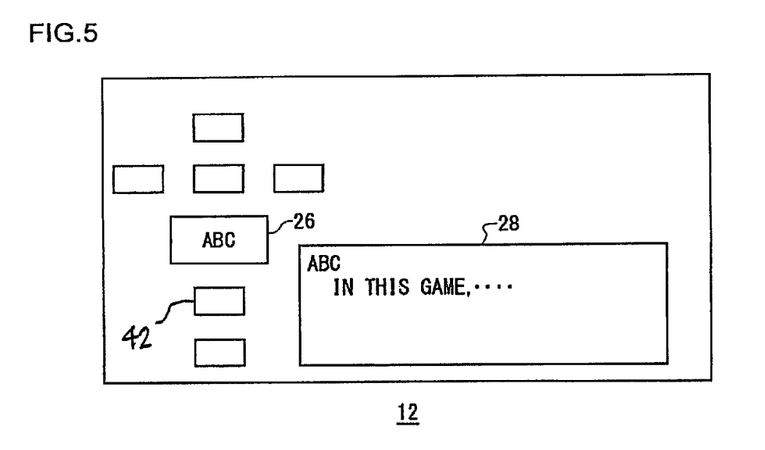
FIG. 5 illustrates a menu screen generated in a display device.

FIG. 5 illustrates a menu screen generated in the display device 12. The menu screen displays the content information acquired by the content information processor 138. An icon 26 displays the title name of the game application, and an explanatory image 28 displays an explanation of the game application. When a user selects the icon 26 on the menu screen via the game controller 40, the game boot file is executed. If the patch file of the game data is stored in the hard disk drive 34, the game console 10 chooses a newer version of the boot file from the boot file included in the patch file or that which has been recorded in the ROM medium 50 and executes the chosen file. Hereinafter, the description will be given in more detail.

When the user selects the icon 26 of the game application, the configuration file reading unit 122 reads in the configuration file recorded in the ROM medium 50. The name of the configuration file is "PARAMETER.A", and may be common to all game data.

Figure 6:
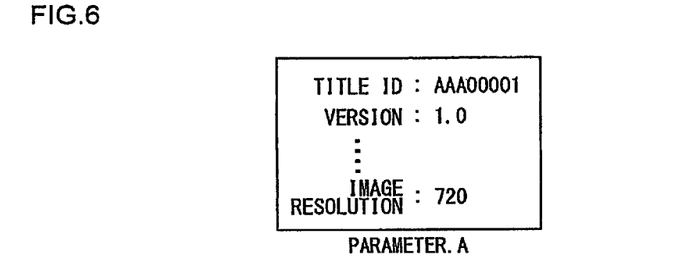
FIG. 6 illustrates an example of a configuration file recorded in a ROM medium.

FIG. 6 illustrates an example of the configuration file recorded in the ROM medium 50. The title ID, version information, image resolution, etc. are written in the configuration file. In this example, the title ID is "AAA00001", the version is "1.0", and the image resolution is "720". The version information represents the version of the boot file produced by a game production company. In the version information, the minimum value of the left digit is 1, and the minimum value of the right digit is 0. So, the version information "1.0" means that it is the earliest version.

According to the version information of the present embodiment, the right digit is incremented when a minor change is made in the boot file, whereas the left digit is incremented and the right digit is returned to 0, when a major modification is made in the boot file. Accordingly, when the version information is compared, it is determined that the version information having the greater left digit indicates the newer version and it is also determined that when the left digits are equal, the version information having the greater right digit is the newer version. For instance, in comparing the version "1.0" with the version "1.1", the version "1.1" is newer. In comparing the version "2.0" with the version "1.1", the version "2.0" is newer. The left digit is incremented, for example, when the ROM medium 50 is remastered. That is to say, the version information of the ROM medium 50 is changed to "2.0" when it is remastered, and from then, the version information is given to the patch file of this game data such that the right digit is incremented.

In the present embodiment, the directory for storing the patch file may be identified by, for example, the title ID of the game data. Since the title ID is given to each piece of the game data, the directory for storing the patch file can be created for each piece of the game data by utilizing the title ID as the directory name. Also, the name of the directory for storing the patch file may be represented by another type of information uniquely given to each piece of the game data.

Figure 7A:
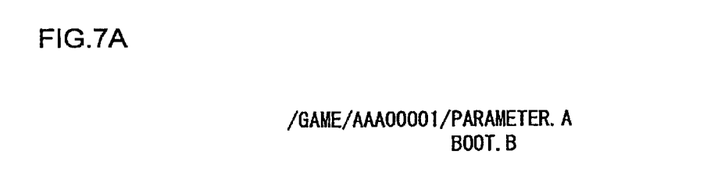
FIG. 7A illustrates a path of a patch file.

FIG. 7A illustrates a path of a patch file. The patch file includes a configuration file (PARAMETER.A) and a boot file (BOOT.B).

After downloading the patch file through the network 16, the patch file acquisition unit 140 extracts the "title ID" included in the configuration file of the patch file, creates a directory representing the title ID in a layer lower than the GAME directory, and stores the patch file in the directory. In this manner, the path of FIG. 7A may be formed on the basis of the information included in the patch file. Also, an installer for installing a patch file may be equipped in the game console 10, so that the installer can configure the location where the patch file is stored interactively with a user. In this process, preferably, the game console 10 stores the location where the patch file is stored and the title ID by linking up to each other, so that the location where the patch file is stored can be identified by the title ID stored in the ROM medium 50 as a key. In addition, the title ID is not the only information linked with the location where the patch file is stored and the information for identifying the storage directory. Another type of information uniquely given to each piece of the game data may be employed.

The configuration file included in the ROM medium 50 may include the information that identifies the location in the hard disk drive 34 where the patch file is stored. For example, the configuration file of the ROM medium 50 may retain the path to the configuration file and the boot file of the patch file in the hard disk drive 34 that is identified by the directory and the file name. The configuration file included in the ROM medium 50 may retain the directory that stores the configuration file and the boot file of the patch file. In the file update system 2, the name of the configuration file and the name of the boot file included in the patch file have already been determined when the ROM medium 50 is produced. Therefore, the information that identifies a path (hereinafter, referred to as path identifying information) identifies the location where in the hard disk drive 34 the patch file is stored, and can be included in the configuration file of the ROM medium 50. The configuration file of the ROM medium 50 may retain the path identifying information for identifying the configuration file of the patch file, and may also retain the directory identifying information of the boot file, or vice versa.

The path identifying information and the directory identifying information may be the information that directly identifies the path and the directory, respectively. But, the path identifying information and the directory identifying information may be the information that indirectly identifies the path and the directory, respectively, when the path identifying information and the directory identifying information is processed by the game console 10. For example, the directory of FIG. 7A can be derived from the title ID of FIG. 6. In such case, the tile ID is used as the information that indirectly identifies the storage directory.

Figure 7B:
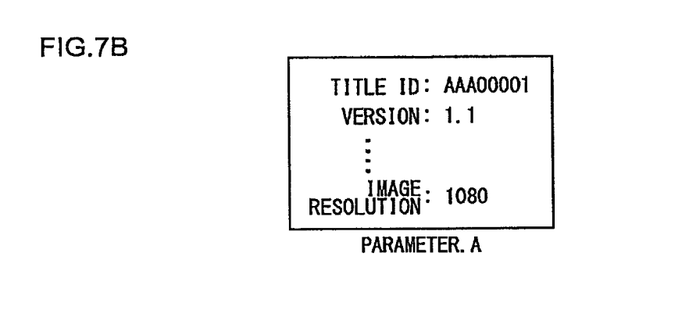
FIG. 7B illustrates an example of the configuration file included in the patch file.

FIG. 7B illustrates an example of the configuration file included in the patch file. The title ID, the version information, and the image resolution are written in the configuration file. In this example, the title ID is "AAA00001", the version is "1.1", and the image resolution is "1080". When compared with the configuration file in the ROM medium 50 of FIG. 6, the image resolution is increased from 720 to 1080 (full HD) and the version is upgraded. In addition, when the version information is "1.1", this means that the right digit is incremented by 1.

Referring back to FIG. 4, the configuration file reading unit 122 reads in the configuration file (see FIG. 6) recorded in the ROM medium 50, via the media drive 32. The first version information acquisition unit 124 acquires the version information from the configuration file read (hereinafter, the version information will be referred to as "first version information"). The first version information acquisition unit 124 acquires the first version information "1.0" recorded in the ROM medium 50.

The second version information acquisition unit 126 functions as a search unit that identifies the directory in which the patch file is stored, from the title ID of the configuration file read by the configuration file reading unit 122, and searches whether the patch file is retained. If the patch file of the game data identified by the title ID "AAA00001" has not been downloaded yet, this means that the directory does not exist. The second version information acquisition unit 126 reads out the configuration file (see FIG. 7B) of the patch file from the identified directory, and acquires the version information (hereinafter, referred to as "second version information"). When the configuration file read by the configuration file reading unit 122 includes the path identifying information or the directory identifying information of the directory where the patch file is stored, the second version information acquisition unit 126 identifies the storage directory based on the information and acquires the version information. When the storage directory is identified based on the title ID or the directory identifying information, the second version information acquisition unit 126 searches the directory for the configuration file. This is enabled because the second version information acquisition unit 126 has already recognized that the name of the configuration file of the patch file is "PARAMETER.A". The second version information acquisition unit 126 acquires the second version information "1.1" of the patch file.

The comparator 128 compares the first version information acquired by the first version information acquisition unit 124 with the second version information acquired by the second version information acquisition unit 126, and the determination unit 130 determines which is the newer one of the two, the first version information or the second version information. In the above example, the first version information is "1.0" and the second version information is "1.1". Therefore, the determination unit 130 determines that the second version is newer than the first version. If the storage directory does not exist, or if the storage directory exists but the patch file does not exist, the second version information acquisition unit 126 cannot acquire the second version information. Therefore, the determination unit 130 determines that the first version information is the newest one.

The boot sequence execution unit 134 loads into the main memory 102 or into the local memory 162, a given file having a newer version from either the ROM medium 50 or the patch file. The given file described above may be a boot file. The boot sequence execution unit 134 reads out the boot file from the patch file to which the second version information is given, and then loads the boot file into the main memory 102 or the local memory 162. After that, the boot sequence execution unit 134 executes the boot sequence of the game data, namely, the game boot process. The boot sequence causes the configuration of the game console 10 to enter the game execution mode, and then the execution environment of the game data is arranged. Specifically, the environment is formed in accordance with the configuration file of the patch file. For example, the resolution of the image to be output is set at 1920×1080 (see FIG. 7). The application execution unit 136 is capable of initiating the main program in such formed game execution environment and executing the game application.

The boot sequence execution unit 134 does not initiate the boot sequence, when the ROM medium 50 is not loaded into the media drive 32. In the present embodiment, when the ROM medium 50 is loaded into the media drive 32, the process for authenticating the ROM medium 50 is executed. When the ROM medium 50 is determined to be authentic, the icon 26 is displayed on the menu screen as depicted in FIG. 5. In the game console 10, the user's operation of selecting the icon 26 is the condition for the booting of the game data. This permits the establishment of the game environment where the patch file cannot be activated without the genuine ROM medium 50.

Figure 8:
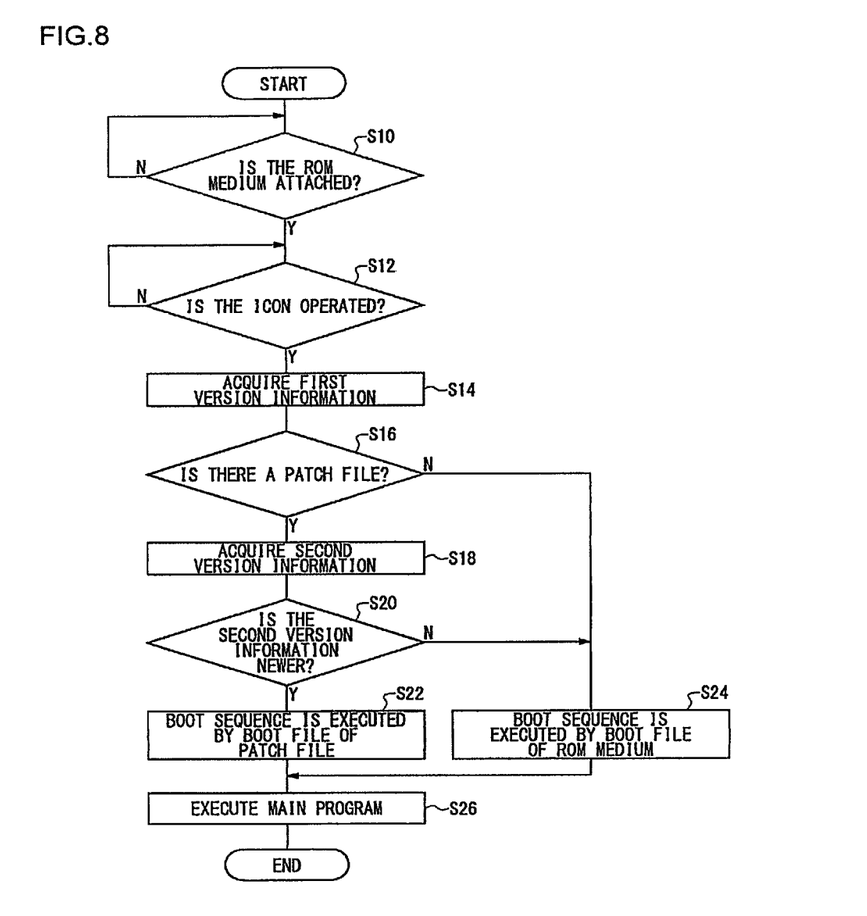
FIG. 8 illustrates a flowchart of a process of executing game data.

FIG. 8 illustrates a flowchart of a process of executing the game data. In the game console 10 according to the present embodiment, the game data will not be executed, unless the ROM medium 50 is loaded into the media drive 32 (N in S10). When the ROM medium 50 is loaded into the media drive 32 (Y in S10), the process for authenticating the ROM medium 50 is initiated. When the ROM medium 50 is determined to be authentic, the menu screen depicted in FIG. 5 is displayed on the display device 12. When a user does not select the icon 26 (N in S12), the game data is not executed. When the icon 26 is selected (Y in S12), the first version information acquisition unit 124 acquires the first version information recorded in the ROM medium 50 (S14). Subsequently, the second version information acquisition unit 126 searches the hard disk drive 34, and determines whether or not there is a patch file for the game data in the ROM medium 50 (S16). When the patch file does not exist (N in S16), the boot sequence execution unit 134 reads the boot file from the ROM medium 50 and executes the boot sequence (S24). The application execution unit 136 executes the main program (S26).

Meanwhile, when the patch file exists (Y in S16), the second version information acquisition unit 126 acquires the second version information included in the patch file (S18). The comparator 128 compares the first version information with the second version information, so the determination unit 130 determines the newer one of the two (S20). When the first version information is newer (N in S20), the boot sequence execution unit 134 reads the boot file from the ROM medium 50 and executes the boot sequence (S24). Conversely, when the second version information is newer (Y in S20), the boot sequence execution unit 134 reads the boot file from the patch file and executes the boot sequence (S22). The application execution unit 136 executes the main program (S26).

Figure 9:
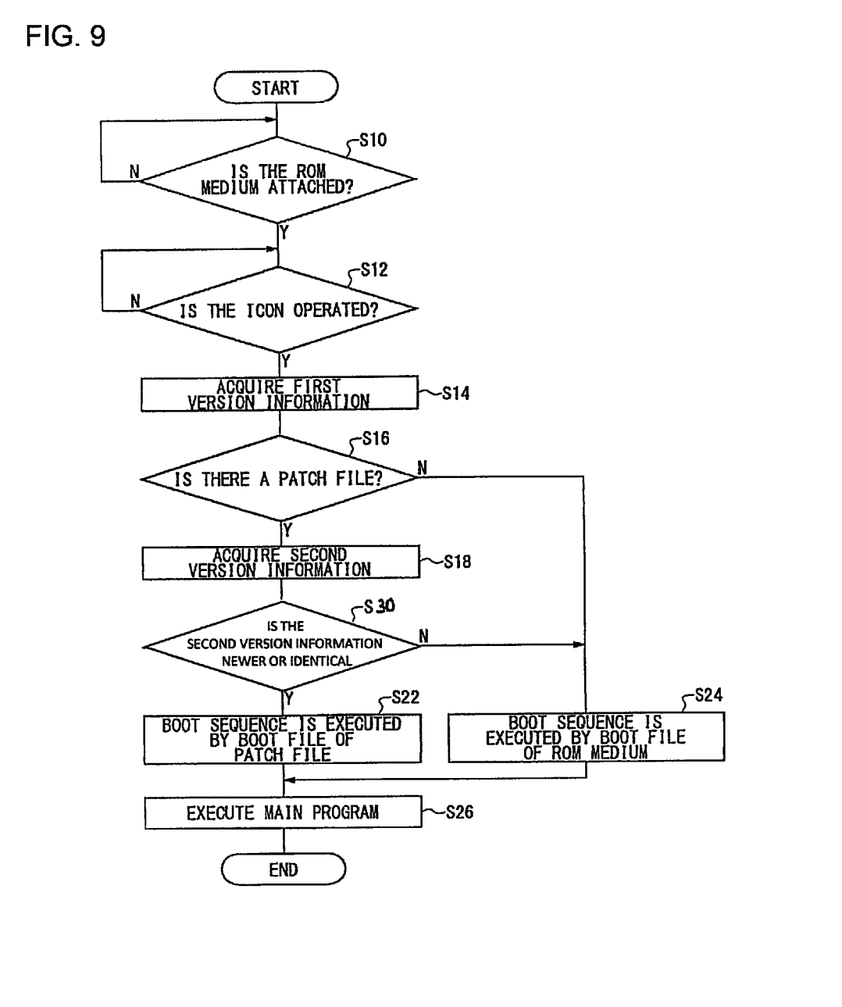
FIG. 9 illustrates an alternative flowchart of a process of executing game data.

As a result of the comparison made by the comparator 128, there could be a case where the determination unit 130 determines that the first version information is identical to the second version information. This occurs, for example, when there is an error while the patch file is being downloaded or the version setting is wrong. In such case, the boot sequence execution unit 134 may read out the boot file stored in the hard disk drive 34 as shown in FIG. 9 step S30 and execute the boot sequence. Since the access to the hard disk drive 34 is faster than the access to the ROM medium 50, the boot sequence may be executed by use of the boot file of the patch file in consideration of the processing speed, if the first version information is identical to the second version information.

In consideration of reliability, the boot file of the ROM medium 50 can be executed by priority. Since the patch file is acquired via an external network 16, the patch file cannot be acquired in a perfect state, in some cases, due to a communication error or the like. In such case, when the first version information is identical to the second version information, the boot sequence execution unit 134 may execute the boot sequence using the boot file in the ROM medium 50, because the data of the boot file in the ROM medium 50 has a much higher reliability.

When the first version information is identical to the second version information, which boot file should be activated by priority is an important design element and has to be determined in accordance with operational policies of the file update system 2.

The description of the invention given above is based upon the embodiment. The embodiment is illustrative in nature and various variations in constituting elements and processes involved are possible. Those skilled in the art would readily appreciate that such variations are also within the scope of the present invention. According to the embodiment, the ROM medium has been discussed as an example of a recording medium in which game data is recorded. The recording medium, however, may be, for example, a medium in which information is rewritable. Even in such case, preferably, it is possible to determine that the recording medium is authentic by the authentication process. Also, according to the embodiment, a newer version is determined and then the boot file of the newer version is executed. To simplify the process, if there is a patch file, the boot sequence execution unit 134 may execute the boot file of the patch file, and if there is no patch file, the boot sequence execution unit 134 may execute the patch file for the ROM medium 50.

According to the embodiment, the second version information acquisition unit 126 acquires the version information of the patch file from the configuration file. However, the version information of the patch file may be stored in a database for the version management. The file for the version management includes the information on the latest versions of all the patch files that have been downloaded. The second version information acquisition unit 126 is capable of acquiring the second version information promptly by using the above file, thereby facilitating the efficiency of the processing.

According to the embodiment, a description has been given of the process in which when the authentication process of the ROM medium 50 is successfully completed, the content information processor 138 reads the content information of the ROM medium 50 and displays the icon 26 of FIG. 5 and the explanatory image 28 on the menu screen. The operation of selecting the icon 26 is a trigger to start the process of comparing the version of the ROM medium 50 with that of the patch file. As a variation, when the authentication process of the ROM medium 50 is completed, the process of comparing the version of the ROM medium 50 with that of the patch file to determine the newer version may be initiated. In this process, when the version information of the patch file is newer and the patch file includes the content information, the content information processor 138 may display the icon and the explanatory image on the menu screen, on the basis of the content information included in the patch file. In such case, the operation of selecting the icon may be a trigger to execute the boot file in the patch file.

Also, a description has been given of the case where the patch file includes the configuration file and the boot file. However, the patch file may include an amendment file or a differential file of the main program. In such case, if the version information of the patch file is newer, the boot sequence execution unit 134 executes the boot sequence using the boot file of the patch file. The application execution unit 136 loads into the memory the main program recorded in the ROM medium 50 and the amendment file for the main program of the patch file, and executes the game application. In addition, the updated main program, instead of the amendment file, may be included in the patch file. In such case, the updated main program can be executed independently.

According to the embodiment, it is assumed that a game application is executed by a single ROM medium 50. However, it may also be assumed that a game application is executed by plural ROM media 50. There are following relationships between plural ROM media 50 and the patch file.

The first relationship is that one patch file is created for plural ROM media 50. The patch file includes: a configuration file; a boot file; and a differential file of the main program common to plural ROM media 50. The second relationship is that the patch files are respectively created for plural ROM media 50, and are stored in an identical directory. Each of the patch files includes: a configuration file; the boot file; and the differential file of the main program for the corresponding ROM medium 50. The third relationship is that the patch files are respectively created for plural ROM media 50, and are stored in different directories. Each of the patch files includes: the configuration file; the boot file; and the differential file of the main program for the corresponding ROM medium 50.

In any of the above relationships, when one of the plural ROM media 50 is loaded into the media drive 32, the icon 26 is displayed on the menu screen as described above. The operation of selecting the icon 26 initiates the process of identifying the latest boot file.

It is assumed that the first ROM medium 50 is changed to the second one, while the game data is being executed by the first ROM medium 50. A process of changing the medium will now be described with the attention focused on whether the process is executed by the OS or by the application software. Firstly, an instruction of replacing the ROM medium 50 is displayed on the display device 12 by the application software. A user looks at the instruction, and replaces the ROM medium 50. When the OS recognizes that the ROM medium 50 has been replaced by another ROM medium 50 (hereinafter, referred to as a replacing ROM medium), the OS executes an authentication process to learn whether or not the replacing ROM medium 50 is an authentication product. When the replacing ROM medium 50 is an authentication product, the OS identifies the location where the patch file of the replacing ROM medium 50 is stored, extracts the version information from the patch file, and compares the version information of the patch file with that of the replacing ROM medium 50. After determining the latest version information, the OS gives a notification to the application software. When the version information of the patch file is newer, the application software is capable of acquiring the patch file as necessary and executing the game data with the latest version.

Referring back to FIG. 5, for example, the icon 26 indicating the game data of the ROM medium 50 is displayed on the menu screen. In addition, if another kind of game data is installed in the hard disk drive 34, another icon indicating another kind of game data may be displayed on the menu screen. That is to say, the icon indicating the game data recorded in the ROM medium 50 and another icon indicating another kind of game data installed in the hard disk drive 34 may be displayed on the menu screen, as a list.

In this case, when the display item of the menu is changed, the list of icons 42 indicating all the patch files acquired by the patch file acquisition unit 140 may be displayed. In the game system 1, even when the icon of the patch file 42 is selected and operated, the boot sequence of the game data, namely, the process of activating the game is not initiated. In any case, the operation of selecting the icon 26 indicating the presence of the ROM medium 50 is a trigger to start executing the process of initiating the game. The operation of deleting the icon of the patch file 42 allows a user to delete the patch file from the hard disk drive 34; thereby increasing the capacity of empty space in the hard disk drive 34.

What is claimed is:
1. A game apparatus comprising:
a drive device into which a memory medium with game data including a boot file that initiates a main program is loaded;
a storage device which retains a patch file for the game data, the patch file including a boot file that initiates the main program;
a first version information acquisition unit which acquires first version information recorded in the memory medium via the drive device;
a second version information acquisition unit which acquires second version information included in the patch file retained in the storage device;
a comparator which compares the first version information acquired by the first version information acquisition unit with the second version information acquired by the second version information acquisition unit; and
an execution processor which loads into a memory a boot file from either the memory medium or the patch file, which has newer version information and initiates a game startup process,
wherein the execution processor does not initiate the game startup process when the memory medium is not loaded into the drive device, even if the patch file is retained in the storage device, and the execution processor initiates the game startup process on the condition that the memory medium is loaded into the drive device, and wherein, where an icon of the memory medium loaded into the drive device and an icon of the patch file retained in the storage device are displayed on a menu screen showing icons selectable by a user, the game startup process is not initiated when the icon of the patch file is selected, and selection of the icon of the memory medium initiates the game startup process.

2. The game apparatus according to claim 1, further comprising a patch file acquisition unit configured to acquire the patch file for the game data,
wherein the patch file acquisition unit is configured to acquire the patch file, even when the memory medium is not loaded into the drive device.

3. The game apparatus according to claim 1, wherein the second version information acquisition unit identifies a location where in the storage device the patch file is stored, based on information recorded in the memory medium, and acquires the version information included in the patch file.

4. The game apparatus according to claim 3, wherein when the second version information acquisition unit cannot acquire version information of the patch file, the execution processor loads the boot file into the memory from the memory medium.

5. The game apparatus according to claim 1, further comprising:
a determination unit configured to determine that the version information acquired by the first version information acquisition unit is the latest version when the second version information acquisition unit cannot acquire the version information of the patch file.

6. The game apparatus according to claim 1, wherein, when the version information acquired by the first version information acquisition unit is identical to the version information acquired by the second version information acquisition unit, the execution processor loads the boot file into the memory from the storage device.

7. The game apparatus according to claim 1, wherein, when the version information acquired by the first version information acquisition unit is identical to the version information acquired by the second version information acquisition unit, the execution processor loads the boot file into the memory from the memory medium.

8. The game apparatus according to claim 1, wherein the patch file includes an amendment file or a differential file of the main program.

9. An information processing apparatus comprising:
a drive device into which a memory medium with application data including a boot file that initiates a main program is loaded;
a storage device which retains a patch file for the application data, the patch file including a boot file that initiates the main program;
a first version information acquisition unit which acquires first version information recorded in the memory medium via the drive device;
a second version information acquisition unit which acquires second version information included in the patch file retained in the storage device;
a comparator which compares the first version information acquired by the first version information acquisition unit with the second version information acquired by the second version information acquisition unit; and
an execution processor which loads into a memory a boot file from either the memory medium or the patch file, which has newer version information and initiates an application startup process,
wherein the execution processor does not initiate the application startup process when the memory medium is not loaded into the drive device, even if the patch file is retained in the storage device, and initiates the application startup process on the condition that the memory medium is loaded into the drive device, and
wherein, where an icon of the memory medium loaded into the drive device and an icon of the patch file retained in the storage device are displayed on a menu screen showing icons selectable by a user, the application startup process is not initiated when the icon of the patch file is selected, and selection of the icon of the memory medium initiates the application startup process.

10. A game executing method comprising:
retaining a patch file, including a boot file that initiates a main program, for game data;
acquiring version information recorded in a memory medium with the game data including a boot file that initiates the main program;
acquiring the version information included in the patch file;
comparing the version information acquired from the memory medium with the version information acquired from the patch file to determine newer version information;
loading into a memory a boot file from either the memory medium or the patch file, which has newer version information; and
initiating a game startup process,
wherein the initiating of the game startup process does not initiate the game startup process when the memory medium is not loaded into a drive device, even if the patch file is retained, and initiates the game startup process on the condition that the memory medium is loaded into the drive device, and
wherein, where an icon of the memory medium loaded into the drive device and an icon of the patch file retained in the storage device are displayed on a menu screen showing icons selectable by a user, the game startup process is not initiated when the icon of the patch file is selected, and selection of the icon of the memory medium initiates the game startup process.

11. A non-transitory medium containing a program for causing a computer to execute functions comprising:
retaining a patch file, including a boot file that initiates a main program, for game data;
acquiring version information recorded in a memory medium with the game data including a boot file that initiates the main program;
acquiring the version information included in the patch file;
comparing the version information acquired from the memory medium with the version information acquired from the patch file to determine newer version information;
loading into a memory a boot file from either the memory medium or the patch file, which has newer version information; and
initiating a game startup process,
wherein the function of initiating of the game startup process does not initiate the game startup process when the memory medium is not loaded into a drive device, even if the patch file is retained, and initiates the game startup process on the condition that the memory medium is loaded into the drive device, and
wherein, where an icon of the memory medium loaded into the drive device and an icon of the patch file retained in the storage device are displayed on a menu screen showing icons selectable by a user, the game startup process is not initiated when the icon of the patch file is selected, and selection of the icon of the memory medium initiates the game startup process.

* * * * *